April 10, 1928.

C. F. KETTERING 1,665,307

COOLING SYSTEM FOR INTERNAL COMBUSTION ENGINES

Filed April 2, 1923     2 Sheets-Sheet 1

Witnesses
Wm. P. Pasco
Geo. C. Pasco

By

Inventor
Charles F. Kettering
Francis D. Hardesty

His Attorney

April 10, 1928.
C. F. KETTERING
1,665,307
COOLING SYSTEM FOR INTERNAL COMBUSTION ENGINES
Filed April 2, 1923 2 Sheets-Sheet 2
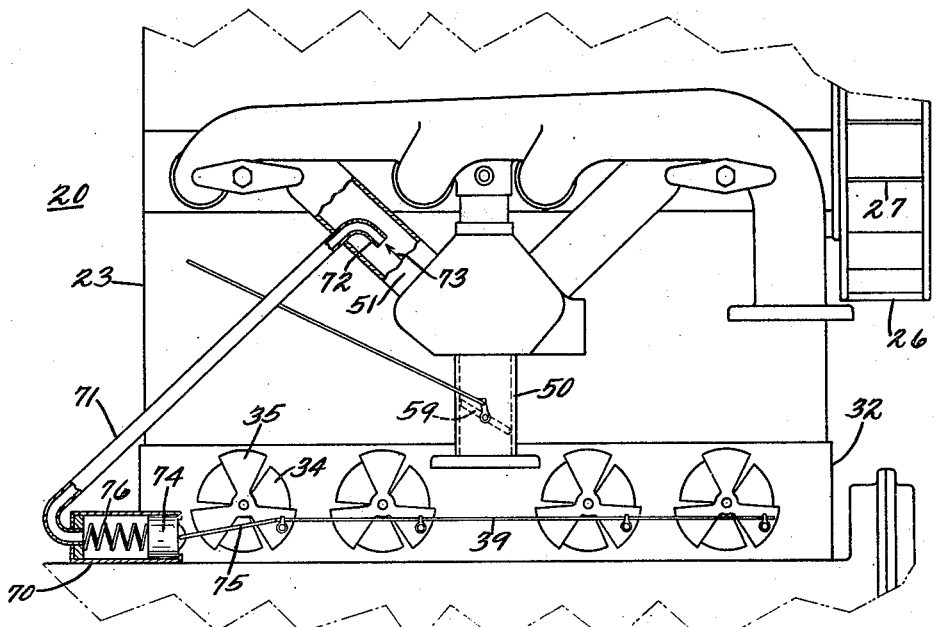
Fig. 2
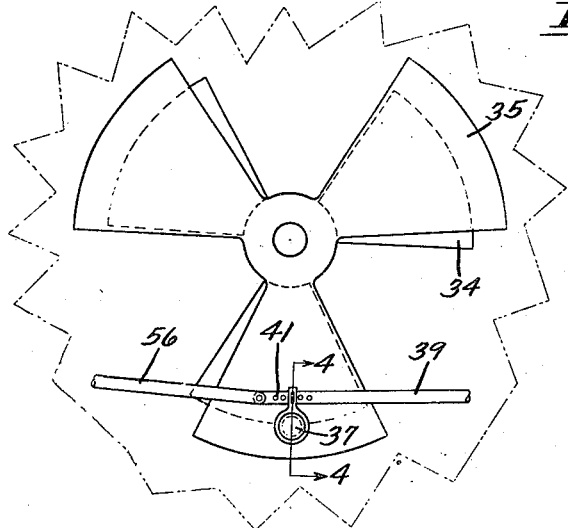
Fig. 3
Fig. 4
Witnesses
Geo. E. Pasco.
Wm. T. Pasco.
Inventor
Charles F. Kettering
By Francis D. Hardesty
His Attorney Patented Apr. 10, 1928.

1,665,307

UNITED STATES PATENT OFFICE.

CHARLES F. KETTERING, OF DAYTON, OHIO, ASSIGNOR TO GENERAL MOTORS RESEARCH CORPORATION, OF DAYTON, OHIO, A CORPORATION OF DELAWARE.

COOLING SYSTEM FOR INTERNAL-COMBUSTION ENGINES.

Application filed April 2, 1923. Serial No. 629,337.

This invention relates to apparatus for controlling an air-cooled internal combustion engine.

It is among the objects of the present invention to regulate the temperature of the air surrounding the engine in accordance with engine operating conditions, and more particularly in accordance with the power developed by the engine.

Further objects and advantages of the present invention will be apparent from the following description, reference being had to the accompanying drawings, wherein a preferred form of embodiment of the present invention is clearly shown.

In the drawings:

Fig. 2 is a fragmentary view similar to Fig. 1 showing the control of cooling air in accordance with engine intake suction.

Fig. 3 is a detail view of the damper for controlling the admission of cooling air to the engine.

Fig. 4 is a sectional view on an enlarged scale taken on line 4—4 of Fig. 3.

Figure 1:
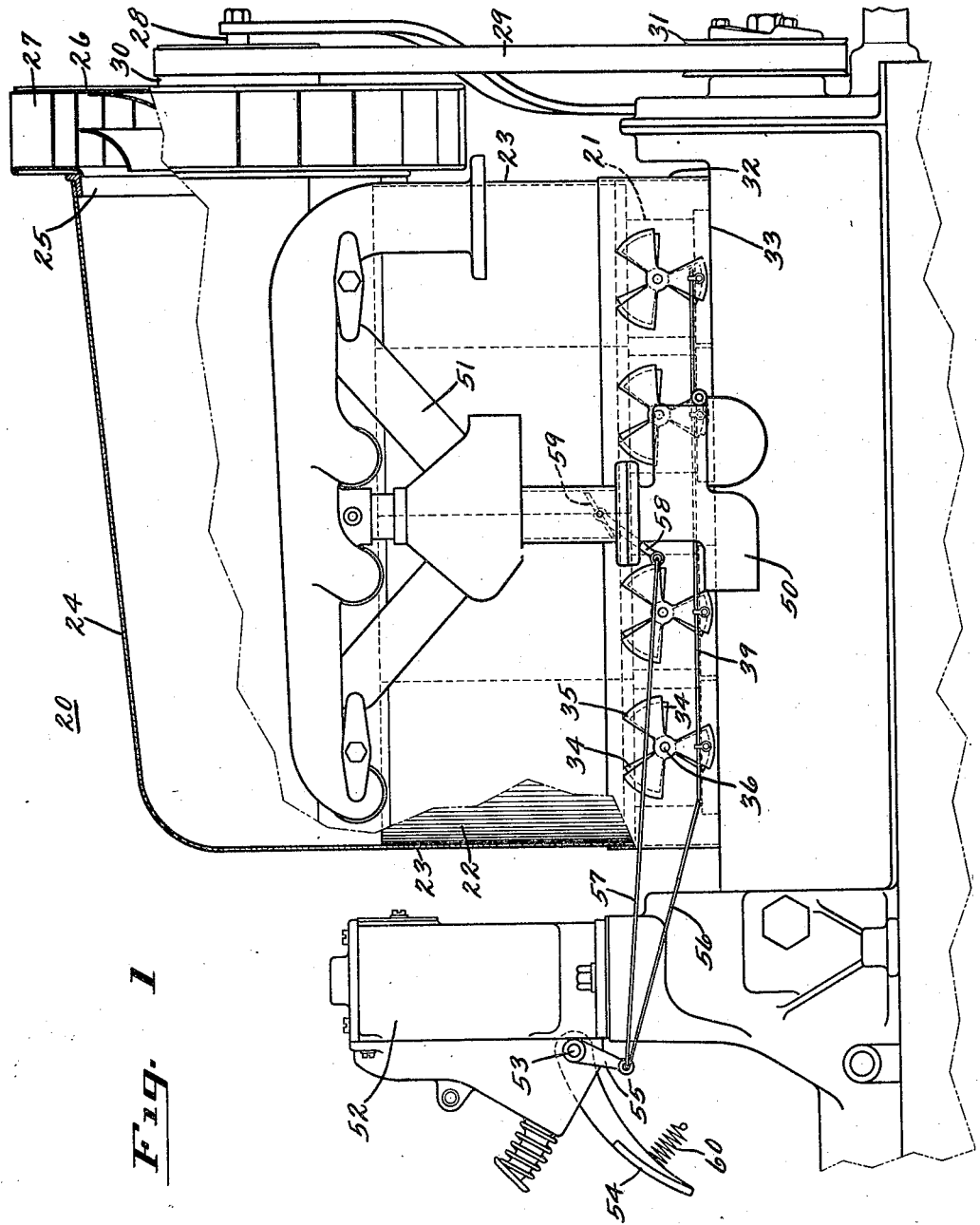
Fig. 1 is a side elevation of an air-cooled engine showing a control of the cooling air in accordance with throttle opening.

In the drawings, an internal combustion engine 20 includes a plurality of cylinders 21 each provided with longitudinally extending fins 22. The means for causing the cooling air to circulate about the engine comprises a draft tube including a skirt portion 23 surrounding the engine cylinder fins and communicating with a hood portion 24 open at one end at 25 to communicate with the inlet of a fan 26 including a plurality of fan blades 27 arranged to throw the air outwardly from the fan. The fan is mounted on a shaft 28 and driven from the engine by means of a belt 29 connected with fan pulley 30 and engine pulley 31. Obviously rotation of the fan will cause air to be drawn upwardly along the cylinder fins 22 and then toward the fan inlet and to be discharged up through the fan blades 27.

The means for controlling the circulation of cooling air through the draft tube members 23 and 24 comprises a draft tube skirt extension 32 which extends downwardly from the draft tube skirt 23 and is shown resting upon the top of the engine frame 33. This extension 32 is provided with a plurality of damper ports 34 each controlled by the vane of the damper valve 35 which is pivoted at 36. The damper valve 35 is constructed so that when it is in the maximum closed position the damper port 34 will still be partly open as shown in Fig. 1 for a purpose to be described later. The damper valves 35 are each provided with a stud 37 on which is pivotally mounted a collar 38 which is apertured to receive an operating rod 39 attached thereto by means of a cotter pin 40. As shown in Fig. 3 the rod 39 is provided with a series of holes 41 adjacent the attachment of the rod to the collar 38. Each hole 41 is adapted to receive the pin 40 so that a rod may be attached to the damper valve 35 in various positions of adjustment.

The form of the invention shown in Fig. 1 includes common means for controlling the circulation of cooling air and also for controlling the throttle. The engine 20 is provided with a carburetor 50 attached to the engine intake 51. An engine starter 52 is supported on the engine crank case and provides the convenient support for a shaft 53 attached to an accelerator pedal 54 and to a lever 55 connected by a link 56 with the operating rod 39. The lever 55 is connected by link 57 with a lever 58 attached to the throttle 59 for controlling the passage of fuel to the engine intake.

The operation of this form of the invention is as follows:

When the engine is at rest or idling, the damper ports 34 will be partly open as shown in Fig. 1 to permit the admission of a small amount of cooling air to the engine. In order to increase the power developed by the engine, whether the power increase be caused by increase of speed or increase in engine torque, the throttle 59 must be opened. This is accomplished by pressing down on the accelerator pedal 54 to open the throttle. Simultaneously therewith, the damper ports 34 are opened to cause more circulating air to pass around the cylinder in order that the temperature of the engine cylinders may not be excessive when the engine is developing greater power.

A return spring 60 of any desirable type is used to return the pedal 54 to normal position when foot pressure is released.

Therefore as the throttle is closed the damper valves 35 will be returned simultaneously to closed position in order to reduce the amount of air circulating about the cylinders in order to prevent excessive cooling of the engine when the engine is developing less power.

Another manner of controlling the circulation of air about the engine is shown in Fig. 2. This apparatus comprises means for controlling the circulation of air in accordance with engine suction and comprises a cylinder 70 attached by suction pipe 71 to the engine intake 51, the end of the pipe being curved at 72 in a direction opposite to the direction of flow of fuel toward the engine cylinders as indicated by the arrow 73. A piston 74 is slidable within the cylinder 70 and is connected by link 75 with the damper operating rod 39. A spring 76 normally holds the piston 74 in the position shown in Fig. 2. When the engine is started up and is idling, the throttle 59 will be partly open therefore the suction in the engine intake 51 will be relatively great and will overcome the spring 76 and cause the piston 74 to be moved to the left thereby causing the damper valves 35 to move to partly closed position as shown in Fig. 1, this position being known as the idling position. When it is desired to increase the speed of the engine or to cause to carry more load at the same speed, the throttle 59 is opened thereby causing the engine intake suction to decrease, thus allowing the spring 76 to move the dampers 35 toward open position more or less in accordance with the drop in suction in the intake 51. Assuming that engine power increase is due primarily to increase in speed, it is obvious that there is a tendency for engine intake suction to increase although the throttle opening may remain the same. This increase in suction would tend to close the dampers. This tendency to increase the suction in the suction cylinder 70 is overcome to some extent by bending the pipe 71 as at 72 in a direction toward the carburetor. The engine fuel rushing into the engine cylinders in the direction of arrow 73 will produce a velocity head at the entrance to pipe 71 thereby tending to counterbalance an increase in suction head. Therefore the suction in the cylinder 70 will tend to decrease as the engine power increases whether the engine increase of power is due to increase of speed or increase in load. In this manner the amount of air circulating about the cylinders is permitted to increase automatically as the engine power increases so that the heating of the engine may not be excessive.

While the form of embodiment of the invention as herein disclosed, constitutes a preferred form, it is to be understood that other forms might be adopted, all coming within the scope of the claims which follow.

What I claim is as follows:

1. In a multiple cylinder air cooled internal combustion engine and in combination with the cylinders thereof, a casing enclosing said cylinders, and a fan for producing a flow of air past said cylinders; a plurality of separate and independent ports leading into said casing; a plurality of dampers cooperating with said ports and adapted to control the flow of air into said casing; a cylinder; a suction pipe leading from said cylinder and opening into the engine intake conduit; a piston operating in said cylinder, and operatively connected with all of said dampers; and a spring acting to hold said dampers in normally closed positions; one port and one damper being associated with each engine cylinder, to thereby control several separate streams of air flowing through said ports and into said casing adjacent the several cylinders of the engine.

2. In a multiple cylinder air cooled internal combustion engine and in combination with the cylinders thereof, a casing enclosing said cylinders, and a fan for producing a flow of air past said cylinders; a plurality of dampers cooperating with ports provided in said casing and adapted to control the flow of air thereinto; a cylinder; a suction pipe leading from said cylinder into the intake conduit of the engine, and which pipe is curved in said conduit and opens in a direction opposite to that of the flow of combustible mixture therethrough; a piston operating within said cylinder, and which piston is operatively connected with said dampers; and a spring acting to hold said dampers in normally closed positions.

3. In a multiple cylinder air cooled internal combustion engine and in combination with the cylinders thereof, a casing enclosing said cylinders, and a fan for producing a flow of air past said cylinders; a plurality of separate and independent ports leading into said casing; a plurality of pivotally supported oscillating dampers cooperating with said ports and adapted to control the flow of air into said casing; a plurality of damper operating collars arranged one upon each of said studs and which collars have openings to receive an operating rod; an operating rod extending through all of said openings; and cotter pins extending through registering holes of said collars and in said operating rod.

4. In a multiple cylinder air cooled internal combustion engine and in combination with a plurality of vertically arranged cylinders; a casing enclosing said cylinders, and which casing includes a hood portion at its upper end extending along the heads of said cylinders; a fan for producing a flow of air upward and past said cylinders and along said hood; a plurality of separate and independent ports leading into the lower end of said casing; a plurality of dampers cooperating with said ports and adapted to control the flow of air into said casing; and a single operating member connected with all of said dampers; one port and one damper being associated with each engine cylinder, to thereby control the several separate streams of air flowing through said ports and into said casing adjacent the lower ends of the cylinders of the engine.

In testimony whereof I hereto affix my signature.

CHARLES F. KETTERING.